(12) United States Patent
Zhao et al.

(10) Patent No.: US 7,885,800 B1
(45) Date of Patent: Feb. 8, 2011

(54) SYNCHRONOUS MODELS IN MODELING ENVIRONMENTS

(75) Inventors: Zhihong Zhao, Salem, NH (US);
Donald Paul Orofino, II, Sudbury, MA (US); Brian K. Ogilvie, Holliston, MA (US); Charles J. Devane, Upton, MA (US)

(73) Assignee: The MathWorks Inc., Natick, MA (US)

( * ) Notice: Subject to any disclaimer, the term of this patent is extended or adjusted under 35 U.S.C. 154(b) by 519 days.

(21) Appl. No.: 10/921,579

(22) Filed: Aug. 18, 2004

(51) Int. Cl.
*G06F 17/50* (2006.01)

(52) U.S. Cl. .................. 703/14; 715/763; 717/105; 717/109

(58) Field of Classification Search .............. 703/15, 703/14; 717/109, 967, 105; 715/763, 970, 715/771
See application file for complete search history.

(56) References Cited

U.S. PATENT DOCUMENTS

| | | | | |
|---|---|---|---|---|
| 5,481,741 A * | 1/1996 | McKaskle et al. | ........... | 345/522 |
| 5,504,917 A * | 4/1996 | Austin | ............ | 345/522 |
| 6,069,629 A * | 5/2000 | Paterson et al. | ............ | 715/808 |
| 6,476,814 B1 * | 11/2002 | Garvey | .............. | 345/440 |
| 6,584,601 B1 * | 6/2003 | Kodosky et al. | ........... | 716/4 |
| 6,608,638 B1 * | 8/2003 | Kodosky et al. | ........... | 715/771 |
| 6,664,833 B1 * | 12/2003 | Fischer | ............. | 327/170 |
| 6,784,903 B2 * | 8/2004 | Kodosky et al. | ........... | 715/771 |
| 6,945,780 B2 * | 9/2005 | Perry | ........... | 434/11 |
| 6,983,227 B1 * | 1/2006 | Thalhammer-Reyero | ........ | 703/2 |
| 2004/0098239 A1 * | 5/2004 | Guettaf | ............. | 703/15 |

OTHER PUBLICATIONS

TetraMaX ATPG User Guide, Version 2002.05, Synopsis Inc, May 2002, pp. 13.1-13.40, (Referred to as "ATPG").*
"Stateflow, for use with simulink, User's Guide Version 1", The Mathworks, Inc., May 1997, pp. 1.2-1.35 and 3.2-3.34.*
Wu, Yuejian, "Diagnosis of scan chain failures", Northern Telecom, IEEE Xplore, 1998.*
"Simulink—Model-based and system-based design, Using Simulink Version 5", The Mathworks, Jul. 2002, pp. i-xiii, 1.7-1.15, 4.9-4.15, 4.37-4.47, 5.30-5.31.*
"Avant! Star-Hspice User Guide", Avanti Corp., 2002, pp. 17.34-17.41.*
"User's Guide Debussy", NOVAS Software, Inc., San Jose, CA, 2000.*

* cited by examiner

*Primary Examiner*—Paul L Rodriguez
*Assistant Examiner*—Carlos Ortiz Rodriguez
(74) *Attorney, Agent, or Firm*—Nelson Mullins Riley & Scarborough LLP; Kevin J. Canning

(57) ABSTRACT

Methods and systems for providing a synchronous model in a modeling environment are disclosed. The predetermined operations of the model, such as a transition to a state in a state-based modeling environment, are implicitly synchronized with a signal selected by users, such as a clock signal. The predetermined operations of the model may be synchronized on a rising and/or falling edge of the clock signal. The synchronization of the operations is guarded in which the predetermined operation of the model occurs only on the synchronization signal selected by the users while other operations may occur at any time when the model is activated.

33 Claims, 11 Drawing Sheets

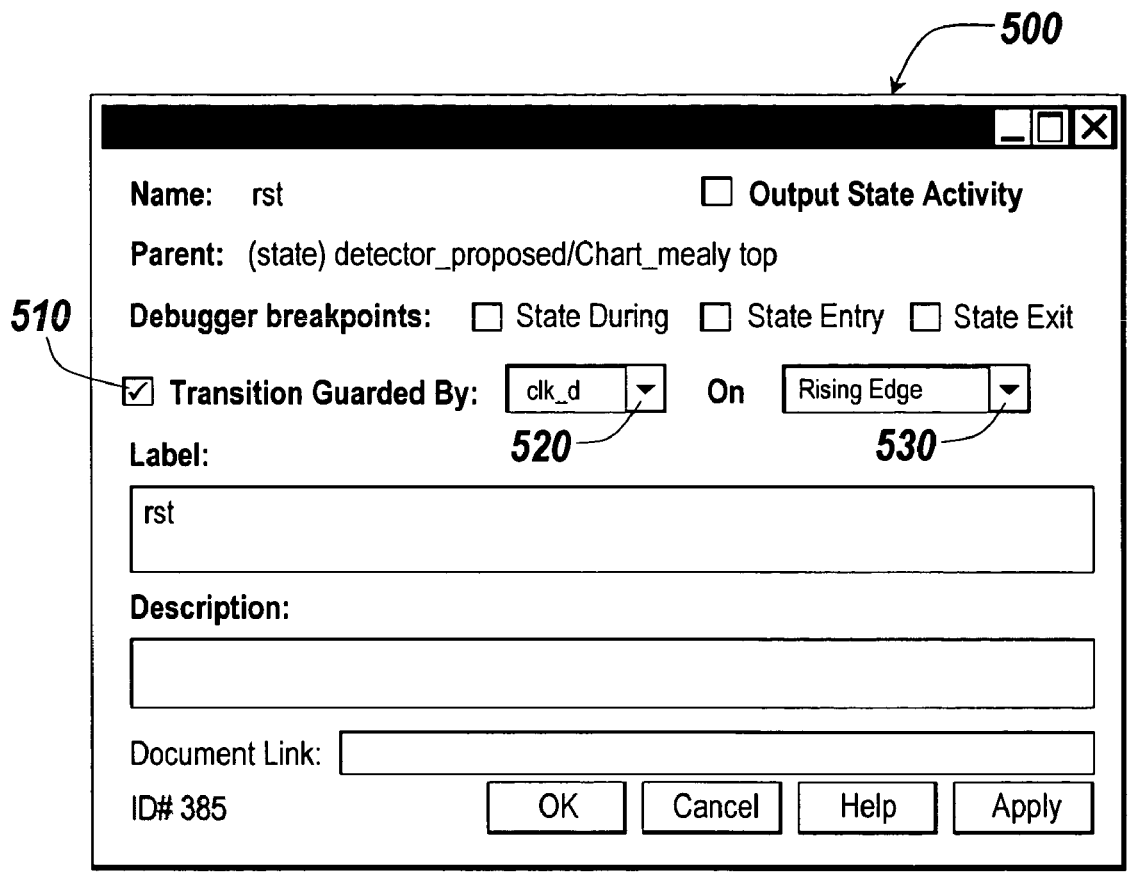
*Fig. 5*
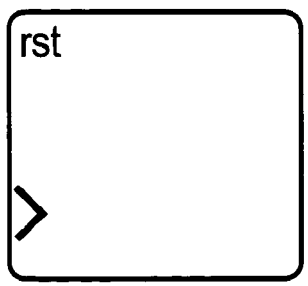 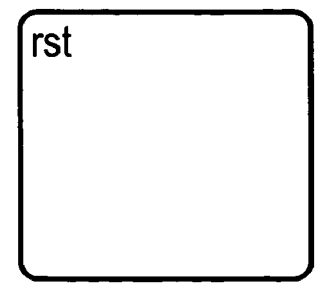
*Fig. 6A*    *Fig. 6B*

SYNCHRONOUS MODELS IN MODELING ENVIRONMENTS

FIELD OF THE INVENTION

The present invention relates generally to modeling environments and more particularly to methods and systems for providing synchronous models in the modeling environments.

BACKGROUND OF THE INVENTION

Various classes of block diagrams describe computations that can be performed on application specific computational hardware, such as a computer, microcontroller, FPGA, and custom hardware. Classes of such block diagrams include time-based block diagrams, such as those found within Simulink®, from The MathWorks, Inc. of Natick, Mass., state-based and flow diagrams, such as those found within Stateflow®, from The MathWorks, Inc. of Natick, Mass., and data-flow diagrams. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages, such as Simulink®. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

In particular, state-based and flow diagram modeling environments, such as Stateflow®, are useful to model event-driven systems. The state-based and flow diagram modeling environments provide a graphical design and development tool for describing complex system behavior using finite state machine theory, flow diagram notations, and state-transition diagrams. The state-based and flow diagram modeling environments enable users to graphically represent hierarchical and parallel states of the systems and the transitions between the states. The transitions between the states are generally triggered by explicit clock signals connected to the states, which makes modeling of the systems more complicated.

SUMMARY OF THE INVENTION

The present invention provides systems and methods for providing a synchronous model in a modeling environment. The present invention synchronizes or guards predetermined operations of the model, such as transitions to states in a state-based modeling environment. The predetermined operations of the model are implicitly synchronized or guarded by a signal, such as a clock signal, selected in a user interface of the model. The predetermined operations of the model may be synchronized or guarded on a rising and/or falling edge of the clock signal. The present invention provides for the "guarded" operations of the model in which the predetermined operations of the model occur only on the selected edge of the signal while other operations may occur at any time when the model is activated.

In one aspect of the present invention, a method is provided for synchronizing a model in a modeling environment. A first graphical element is displayed on a display to represent a first component of the model. A second graphical element is displayed on the display to represent a second component of the model. A third graphical element is displayed between the first and second graphical elements wherein the third graphical element represents an action between the first and second components of the model, which is implicitly guarded by one or more attributes of a predetermined signal.

In another aspect of the present invention, a method is provided for synchronizing a model in a modeling environment. A graphical element is displayed in a display for representing a sub-model of the model. The sub-model includes a plurality of components and an action between the plurality of components is implicitly guarded by one or more attributes of a predetermined signal. The graphical element is provided with a data port to which the predetermined signal is applied.

In still another aspect of the present invention, a medium is provided for holding instructions executable in a computer that runs a software tool for synchronizing a model. A first graphical element is displayed on a display to represent a first component of the model. A second graphical element is displayed on the display to represent a second component of the model. A third graphical element is displayed between the first and second graphical elements wherein the third graphical element represents an action between the first and second components of the model, which is implicitly guarded by one or more attributes of a predetermined signal.

In yet still another aspect of the present invention, a medium is provided for holding instructions executable in a computer that runs a software tool for synchronizing a model. A graphical element is displayed in a display for representing a sub-model of the model. The sub-model includes a plurality of components and an action between the plurality of components is implicitly guarded by one or more attributes of a predetermined signal. The graphical element is provided with a data port to which the predetermined signal is applied.

The present invention provides for a synchronous model that can be easily and simply implemented for the design of models for a wide range of systems. In particular, the present invention enables users to model clock synchronized behavior of hardware systems without adding transition-guarding clock signal to each of the transitions in the chart. Therefore, the present invention dramatically simplifies the design entry for the model of the systems and allows the users to design more complex systems.

BRIEF DESCRIPTION OF THE DRAWINGS

The aforementioned features and advantages, and other features and aspects of the present invention, will become better understood with regard to the following description and accompanying drawings, wherein:

FIG. 5 is an exemplary state dialog for setting data, parameters and operations of the "rst" state depicted in FIG. 3; state dialog is a GUI dialog for display and setting of state object properties;

FIGS. 6A and 6B are exemplary state symbols for the "rst" state depicted in FIG. 3;

DETAILED DESCRIPTION

Figure 1:
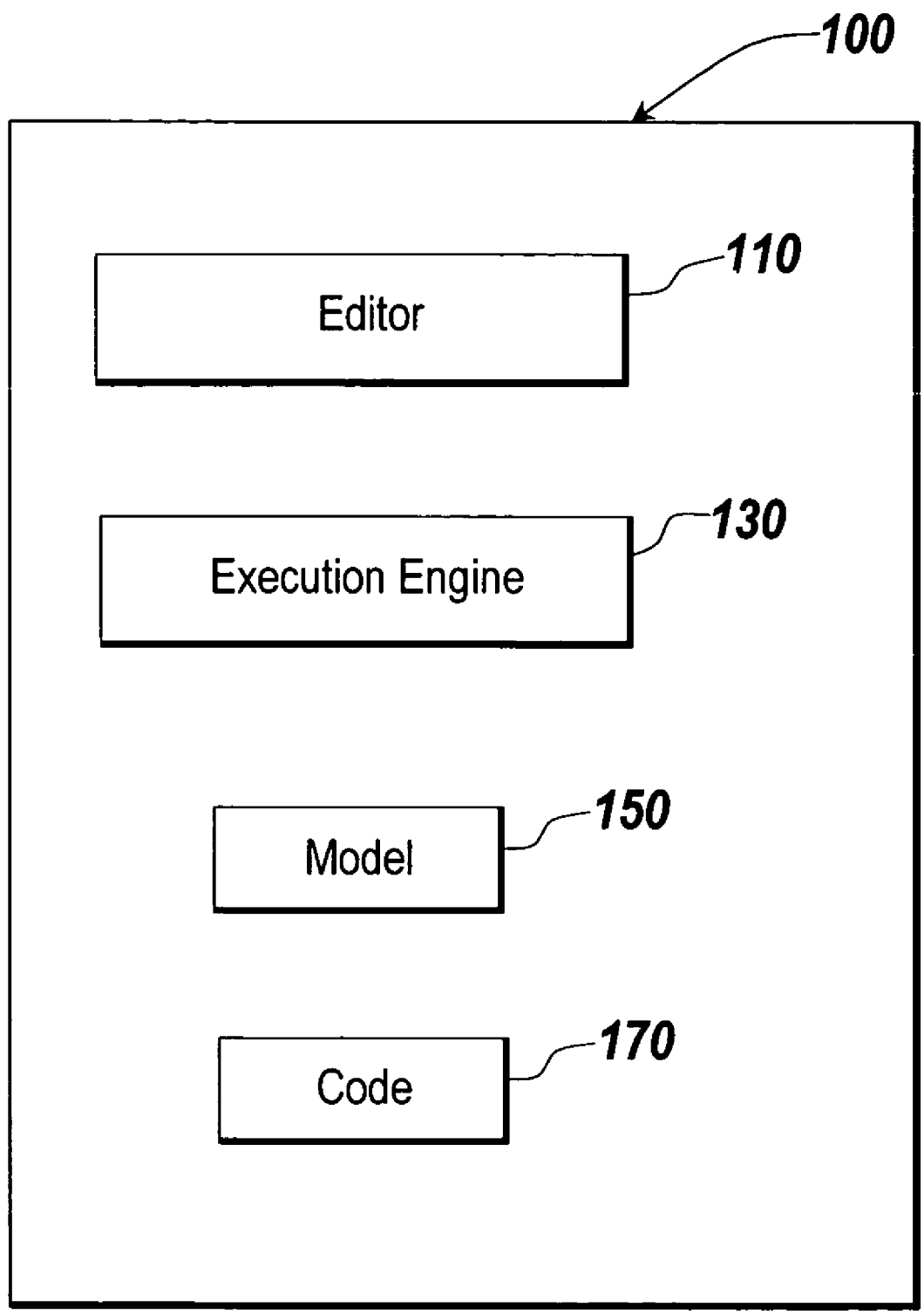
FIG. 1 is an exemplary modeling environment suitable for practicing the illustrative embodiment of the present invention.

The illustrative embodiment of the present invention provides for a synchronous model in a modeling environment. The illustrative embodiment will be described below solely for illustrative purposes relative to a state and flow diagram modeling environment and/or a time-based block diagram modeling environment. Although the illustrative embodiment will be described relative to the state-based and flow diagram modeling environment and/or the time-based block diagram modeling environment, one of skill in the art will appreciate that the present invention may apply to other modeling environments including textual modeling environments, such as command line modeling environments, and different graphical modeling environments, such as data flow modeling environments.

Exemplary environments for the state-based and flow diagram modeling and time-based block diagram modeling may be found in Stateflow® and Simulink®, respectively, both from The MathWorks, Inc. of Natick, Mass. The illustrative embodiment will be described relative to a model implemented in Stateflow® and/or Simulink®. Nevertheless, those who skilled in the art will appreciate that the present invention may be practiced relative to models implemented in other modeling environment, including but not limited to LabVIEW from National Instruments Corporation of Austin, Tex.

Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user-interface that allows drafting of block diagram models of the target systems. All of the blocks in a block library provided by Simulink® and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas).

Stateflow® provides a graphical environment for modeling and designing event-driven systems. Stateflow® describes complex system behavior using finite state machine theory, flow diagram notations, and state-transition diagrams. Stateflow® models state diagrams that graphically represent hierarchical and parallel states and the event-driven transitions between the states of the systems. Stateflow® is integrated with Simulink®, which enables each of the state diagrams to be represented as its own block. Based on the state diagrams created in Stateflow®, Simulink® executes the systems to analyze the behavior of the systems.

In the illustrative embodiment of the present invention, a state diagram including one or more states is generated in the state-based and flow diagram modeling environment. The diagram also includes transitions to the states, which are implicitly synchronized or guarded by a signal, such as a clock signal, predetermined using the chart property dialog or state property dialog. If the diagram is set with the implicit synchronization of the transitions, the transitions to the states in the diagram are guarded on a triggering edge, such as a rising and/or falling edge, of the predetermined signal. The guarded transitions occur only on the selected signal while other operations may occur at any time when the state diagram is activated. The states in the diagram may also be selectively synchronized by a signal selected using the state property dialog of the states. The diagram of guarded transitions may be incorporated into a block diagram model in a time-based block diagram modeling environment.

FIG. 1 shows an exemplary modeling environment 100 in the illustrative embodiment of the present invention. The modeling environment 100 may include an editor 110 and an execution engine 130. The editor 110 allows users to perform such actions as draw, edit, annotate, save, and print a model 150 for a system. The editor 110 is a graphical user interface (GUI) component that allows drafting of the model 150 by the users. Methods used in editing are called by the editor 110 in order to render an icon appropriately in the GUI of the model 150. For instance, this set of methods may include a BlockDrawIcon method that determines the shape the icon has on the GUI. The editor 110 may allow users to specify the properties and parameters of the model 150, which will be described in more detail with reference to the GUIs depicted in FIGS. 4, 5 and 9. A user generally interacts with a set of windows that act as canvases for the model. There is generally more than one window for a model because models may be partitioned into multiple hierarchical levels through the use of subsystems. An exemplary model generated using the editor 110 will be described below with reference to FIGS. 3 and 7.

The execution engine 130 contributes to the modeling software task of enabling the computation and tracing of the dynamic system's outputs from its model 150. The execution engine 130 carries out the task of compiling and linking the model 150 to produce an "in-memory executable" version of the model 170 that is used for generating code 170 and/or simulating or linearizing the model 150. The execution engine 130 may generate code. The execution engine 130 may choose to translate the model 150 (or portions of it) into either software modules or hardware descriptions, for example, Hardware Description Language (HDL). If code is generated, then the generated code is used during the execution of the model 150. If code is not generated, then the execution engine 130 uses an interpretive mode of execution for the model 150.

Figure 2A:
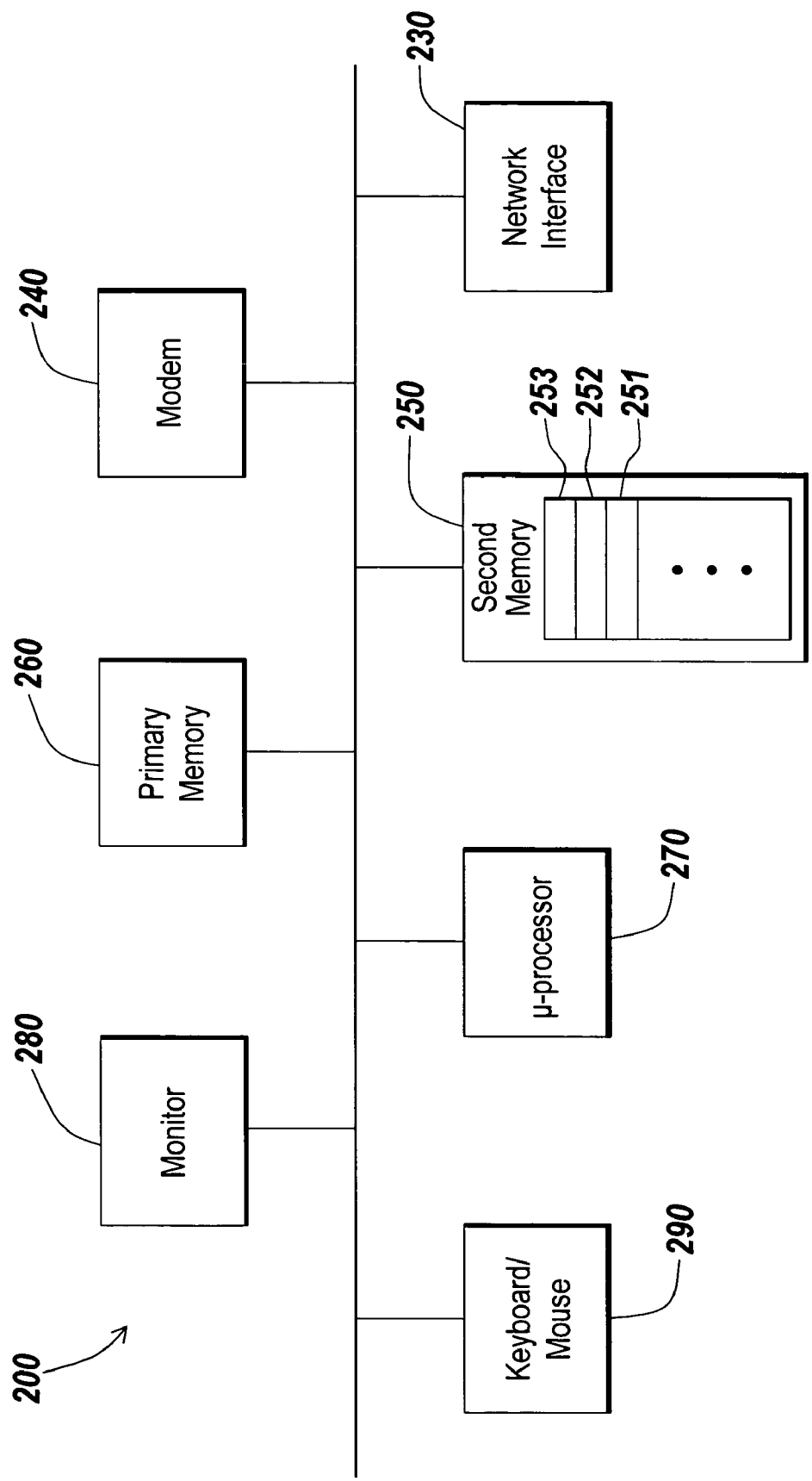
FIG. 2A is an exemplary electronic device suitable for practicing the illustrative embodiment of the present invention.

FIG. 2A is an exemplary electronic device 200 suitable for practicing the illustrative embodiment of the present invention. One of ordinary skill in the art will appreciate that the electronic device 200 is intended to be illustrative and not limiting of the present invention. The electronic device 200 may take any forms, including but not limited to a workstation, server, network computer, Internet appliance, mobile device, a pager, a tablet computer, and the like.

The electronic device 200 includes a network interface 230, a MODEM 240, a secondary memory 250, a primary memory 260, a microprocessor 270, a monitor 280 and a keyboard/mouse 290. The microprocessor 270 controls each component of the electronic device 200 to run software tools for providing the modeling environments properly. The electronic device 200 receives input commands necessary for generating a model, such as the parameters of the components of the model, through the keyboard/mouse 290. The electronic device 200 may display in the monitor 280 the model generated in response to the input commands. The primary memory 260 fetches from the secondary memory 250 and provides to the microprocessor 270 the codes that need to be accessed by the microprocessor 270 to operate the electronic device 200 and to run the modeling environment. The secondary memory 250 usually contains software tools for applications. The secondary memory 250 includes, in particular, code 251 for the editor 110, code 252 for the model 150, and code 253 for the execution engine 130.

One of ordinary skill in the art will appreciate that the electronic device 200 may be connected to communication networks using the MODEM 240 and network interface 230 so that the modeling environments can be provided remotely. The network interface 230 and the MODEM 240 enable the electronic device 200 to communicate with other electronic devices through communication networks, such as Internet, intranet, LAN (Local Area Network), WAN (Wide Area Network) and MAN (Metropolitan Area Network). The communication facilities may provide support for the distributed implementations of the present invention.

Figure 2B:
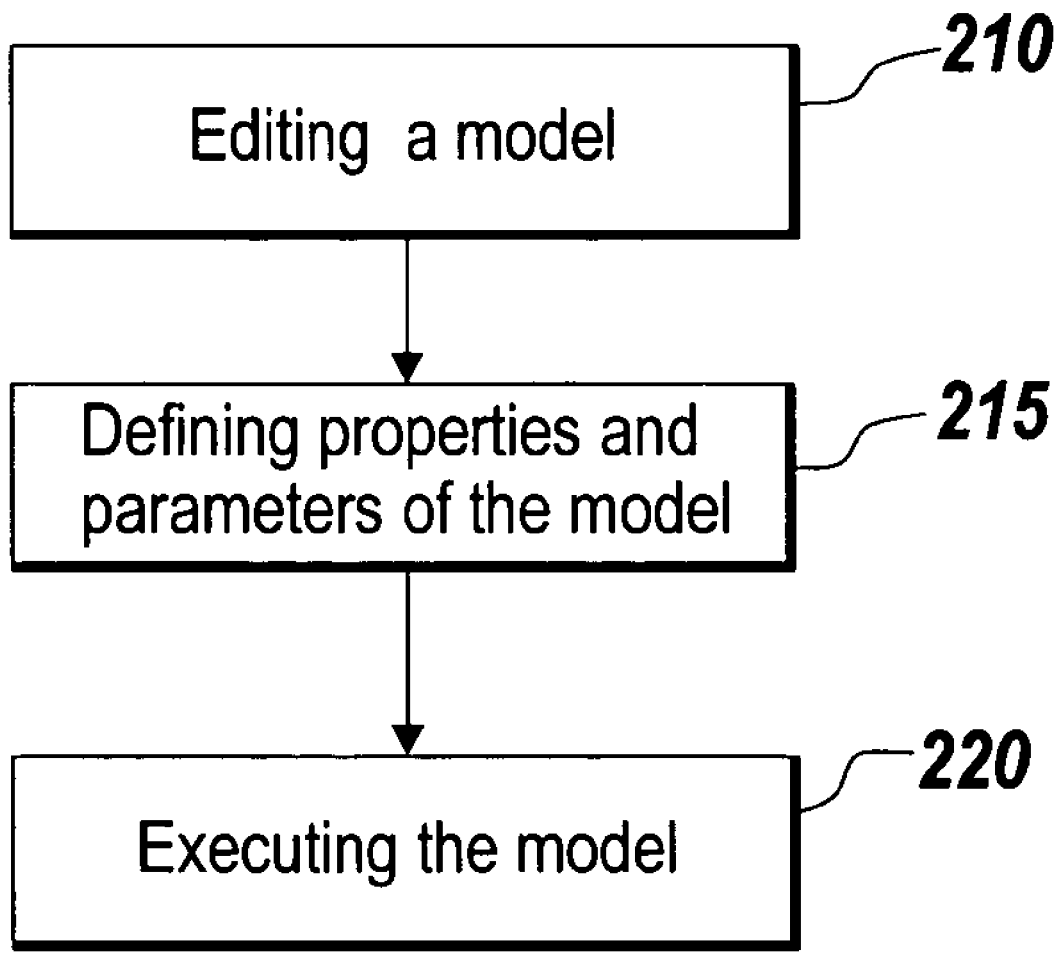
FIG. 2B depicts an exemplary operation the illustrative embodiment of the present invention.
Figure 3:
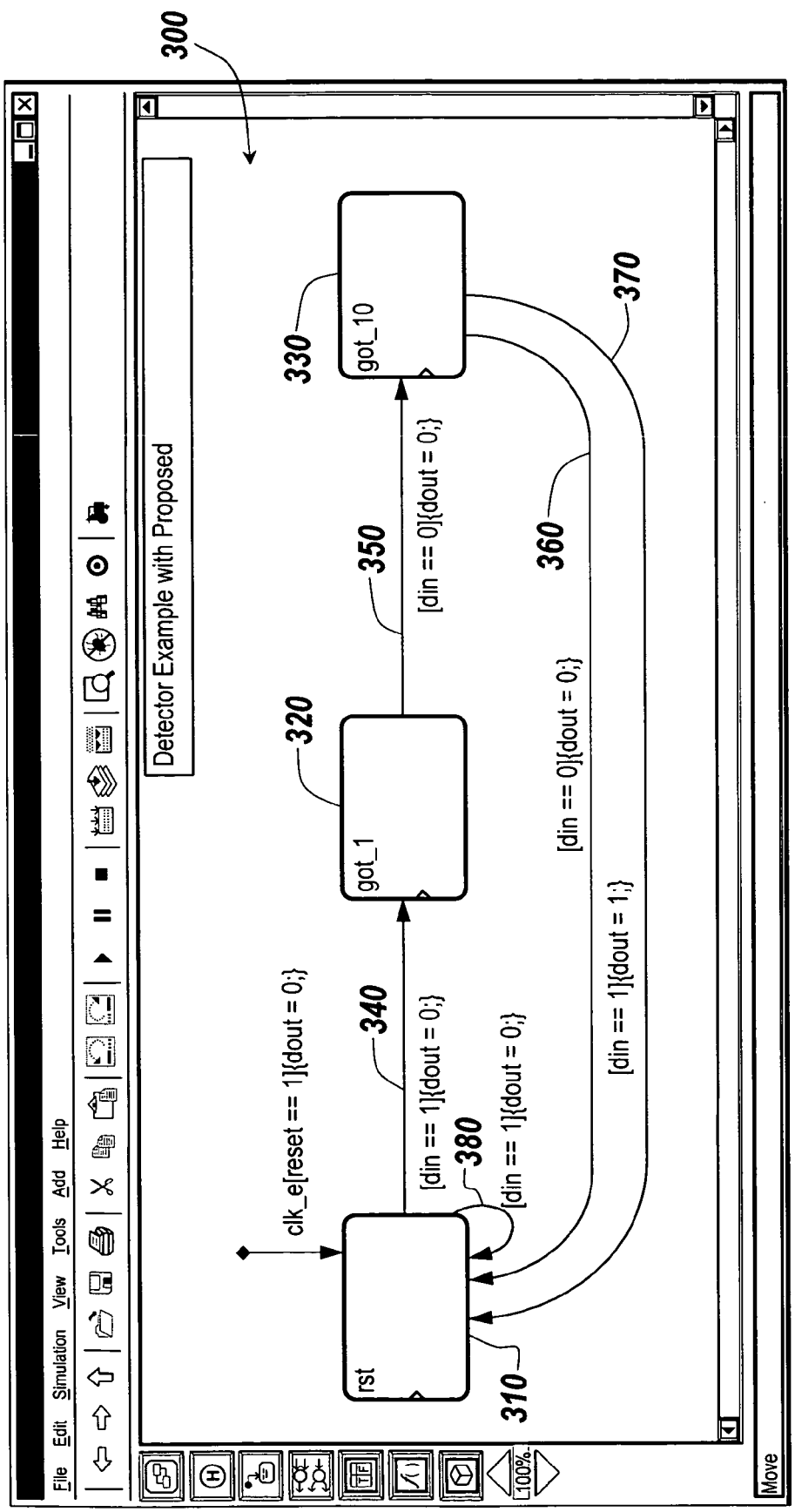
FIG. 3 shows an exemplary state diagram for a Mealy finite state machine, a category of finite state machine whose outputs are a function of the current state and inputs, generated in the state-based and flow diagram modeling environment depicted in FIG. 1.

FIG. 2B depicts an exemplary operation of the illustrative embodiment of the present invention. Users may create a new model or edit an existing model using the editor 110 in the modeling environment 100 (step 210). FIG. 3 depicts an exemplary model, such as a chart for a Mealy finite state machine 300 generated in the state-based and flow diagram modeling environment. The Mealy machine 300 is a category of finite state machine whose outputs are a function of the current state and inputs. In the Mealy finite state machine 300, actions are associated with transitions 340-380 from one state to another and executed as part of the transitions 340-380. The Mealy finite state machine 300 includes three states including "rst" state 310, "got_1" state 320 and "got_10" state 330 in the illustrative embodiment of the present invention. Each of the states 310-330 describes a mode of an event-driven system and the activity or inactivity of the states 310-330 dynamically changes based on events and conditions. When a state is active, the Mealy finite state machine 300 takes on that mode. When a state is inactive, the Mealy finite state machine 300 is not in that mode. The transitions 340-380 are indicated with lines with an arrowhead that link one state to another in the Mealy finite state machine 300. A transition is attached to a source and a destination state. The source state is where the transition begins and the destination state is where the transition ends. For example, the transition 340 is attached to a source state, "rst" state 310, and a destination state, "got_1" state 320.

The Mealy finite state machine 300 includes notations of input conditions and output values on the transitions 340-380 to indicate that the Mealy finite state machine 300 produces an output for each transition depending on an input condition. For example, the transition 340 includes the notations of the input condition, "din==1", and the output value, "dout=0", which means that the Mealy finite state machine 300 produces an output value "0" on the transition 340 if the input condition is "1." The transitions 340-380 to the states 310-330 are guarded by an implicit synchronization signal, such as a clock signal, in the illustrative embodiment of the present invention. In the guarded transitions, the transitions 340-380 to the states 310-330 occur only on the synchronization signal selected by users while other operations, such as producing an output value on the transition, may occur at any time when the chart is activated. The selection of the synchronization signal will be described in more detail in connection with FIGS. 4 and 6. The implicit synchronization of the transitions in the illustrative embodiment enables the users to design the Mealy finite state machine 300 by directly linking the states 310-330 using the transitions 340-380. The implicit synchronization of the transitions 340-380 removes the connections of explicit clock signals to the states 310-330.

Figure 4:
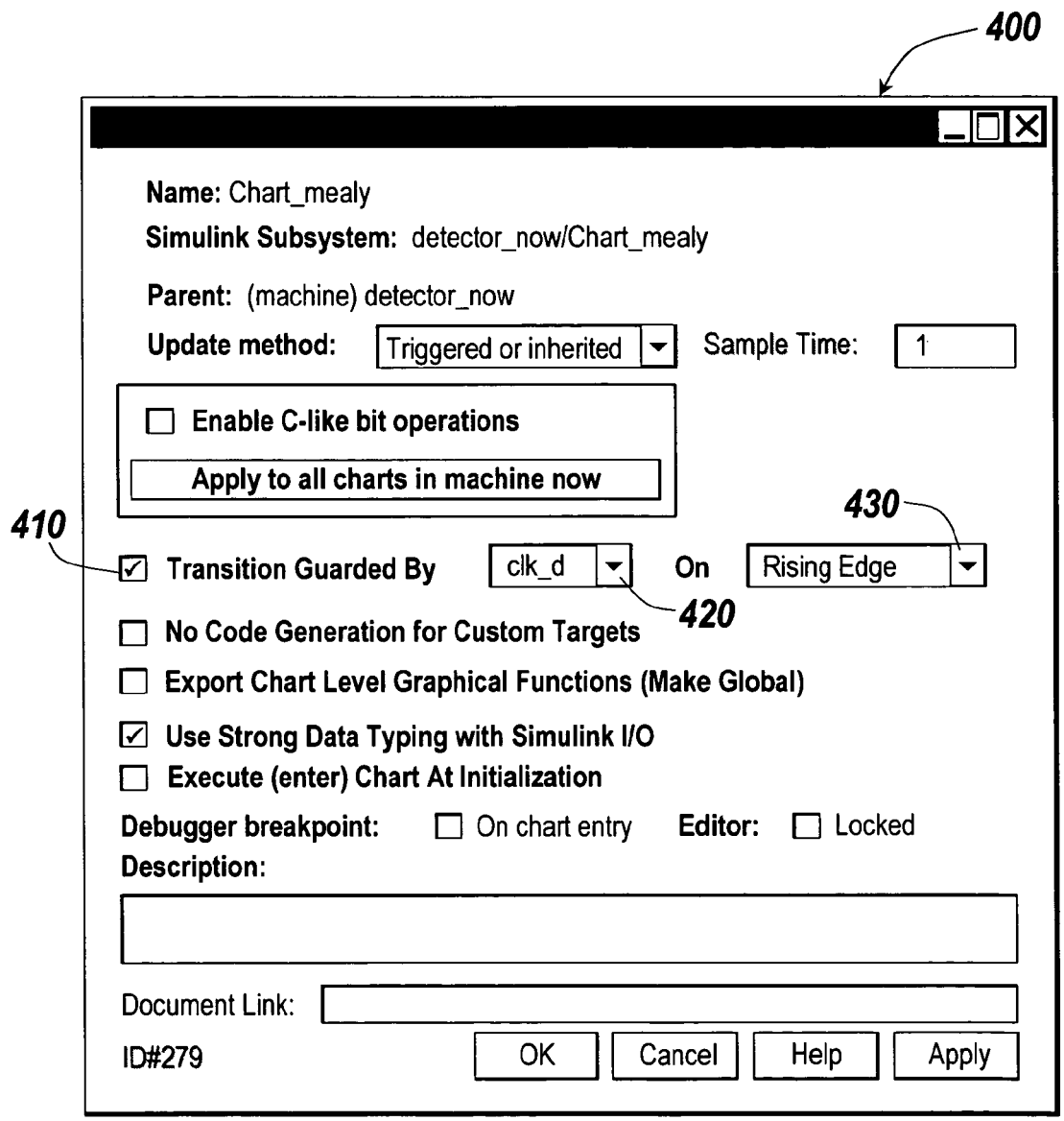
FIG. 4 is an exemplary chart dialog for setting data, parameters and operations of the chart depicted in FIG. 3; chart is a type of object that can contain objects of type state, transition, function, data, junction, note, and box; chart dialog is a GUI dialog for display and setting of chart object properties.

Referring back to FIG. 2B, the properties and parameters of the model 300 may be defined using the GUIs depicted in FIGS. 4 and 5 in editing the model 300 (step 215). FIG. 4 is an exemplary chart dialog 400 for setting data, parameters and operations of the Mealy finite state machine 300. In the illustrative embodiment, a chart refers to a type of object that can contain objects of type state, transition, function, data, junction, note, and box. The chart dialog 400 is a GUI dialog for display and setting of chart object properties. The chart dialog 400 provides an option 410 for selecting whether the transitions 340-380 in the Mealy finite state machine 300 are guarded by a synchronization signal. If the option 410 is selected, the dialog 400 also provides an option 420 for selecting the types of the synchronization signal, such as a clock ("clk_d") signal. The dialog 400 may further provide an option 430 for selecting the triggering edge of the synchronization signal, such as a rising and/or falling edge, for triggering the transitions. If the properties of the synchronization signal are selected by the users, the transitions 340-380 to the states 310-330 in the chart 300 are guarded by the selected signal without explicit connection of clock signals to the states 310-330. One of skill in the art will appreciate that the options 410-430 provided in the chart dialog 400 are illustrative for selecting an implicit synchronization of the transitions 310-330 in the Mealy finite state machine 300 and other types of options may be provided in the chart dialog 400 to select the implicit synchronization of the transitions 310-330 in the Mealy finite state machine 300. One of the alternative options may include the option of selecting "Chart Sample Time," which enables the guarded transitions 340-380 to occur at the designated sample time and sample rate.

Although the chart dialog 400 depicted in FIG. 4 may be used to set up the guard signal for the chart 300, synchronization or guard signals may be selected for each of the states 310-330 using the state dialog depicted in FIG. 5. FIG. 5 is an exemplary state dialog 500 for setting data, parameters and operations of the "rst" state 310. The state dialog 500 is a GUI dialog for display and setting of state object properties. The state dialog 500 provides an option 510 for selecting whether the transitions 360-380 to the "rst" state 310 are guarded by a synchronization signal. If the option 510 is selected, the dialog 500 also provides an option 520 for selecting the types of the synchronization signal, such as a clock ("clk_d") signal. The dialog 500 may further provide an option 530 for selecting the triggering edge of the synchronization signal, such as a rising and/or falling edge, for triggering the transitions 360-380 to the "rst" state 310. If the implicit synchronization option is selected by the users, the transitions 360-380 to the "rst" state 310 are synchronized by the selected signal without explicit connections of synchronization signals to the "rst" state 310. One of skill in the art will appreciate that the options 510-530 provided in the state dialog 500 are illustrative for selecting an implicit synchronization of the transitions 360-380 to the "rst" state 310 and other types of options may be provided in the state dialog 500 to select the implicit synchronization of the transitions 360-380 to the "rst" state 310. One of the alternative options may include the option of selecting "State Sample Time," which enables the guarded transitions 360-380 to the "rst" state 310 to occur at the designated sample time and sample rate.

The same or similar state dialog may be provided for the "got_1" state 320 and the "got_10" state 330. In each state dialog, the guard signal may be selected to different signals than the other states in the chart 300, such as different clock signals. As a result, the transitions 340-380 in the chart 300 may be guarded by multiple clock signals by selecting different clock signals for guarding transitions to each of the states 310-330.

Although the chart dialog 400 depicted in FIG. 4 and the state dialog 500 depicted in FIG. 5 may used to set up the guard signal for the chart 300 and the "rst" state 310, respectively, one of skill in the art will appreciate that synchronization or guard signals may be selected separately for each of the transitions 340-380 in the chart 300 by providing a property dialog (not shown) for each of the transitions.

FIGS. 6A and 6B are exemplary state symbols for the "rst" state 310 depicted in FIG. 3. The symbol in FIG. 6A is an exemplary state symbol for the "rst" state 310 to indicate that an implicit synchronization signal is selected for the "rst" state 310 either in the chart dialog 400 or in the state dialog 500 while the state symbol in FIG. 6B is an exemplary state symbol for the "rst" state 310 that indicates that a synchronization signal is not selected for the "rst" state 310 either in the chart dialog 400 or in the state dialog 500. The state symbol of the illustrative embodiment provides users with a direct visual indication of the "guarded transition" instead of having to open and look into a property dialog. One of skill in the art will appreciate that the state symbol depicted in FIG. 6A is illustrative and other types of graphical and textual variations are possible to indicate the guarded transitions.

Figure 7:
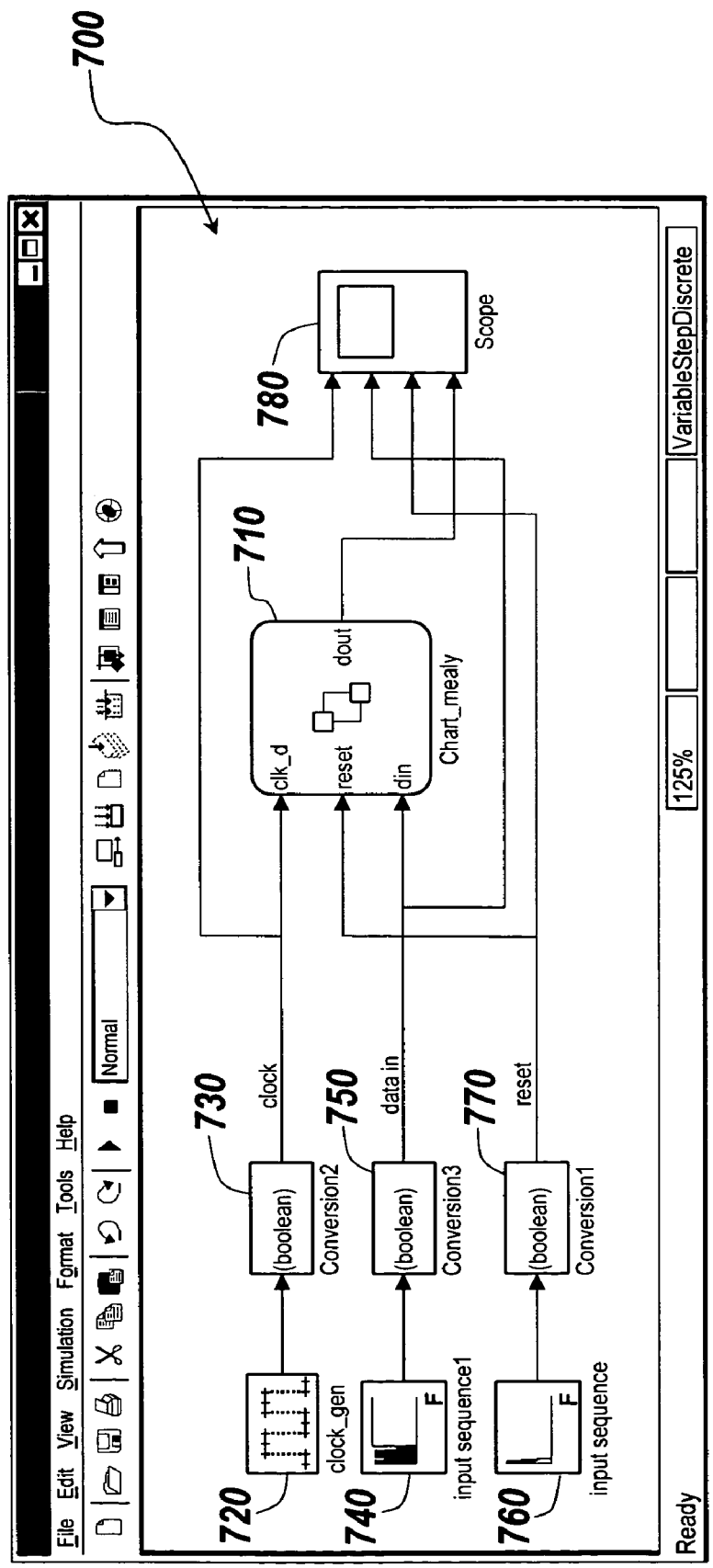
FIG. 7 is an exemplary block diagram model in the time-based block diagram modeling environment, which includes a block representing a state diagram generated in the state-based and flow diagram modeling environment depicted in FIG. 1.

FIG. 7 is an exemplary block diagram model 700 in the time based block diagram modeling environment, which includes Chart_mealy block 710 representing the chart 300 for the Mealy finite state machine 300. The Chart_mealy block 710 includes four ports, such as "clk_d", "reset", "din" and "dout". The block 710 provides the "clk_d" port that receives a clock signal from clock generator block 720 via Conversion2 block 730. The "clk_d" port provides the clock signal to the chart 300 represented by the block 710 that may be used for guarding transitions in the chart 300. The "reset" port receives a reset signal from input sequence block 760 via Conversion1 block 770. The "din" port receives a data in signal from input sequence 1 block 740 via Conversion3 block 740. The "din" port provides the input signal to the chart 300 and the "dout" port provides the output signal from the chart 300 to the scope block 780. The signals applied to the ports of the block 710 are also applied to the scope block 780. The data properties of the ports in the block 710 will be described in more detail below in reference to FIGS. 9 and 10.

Figure 8A:
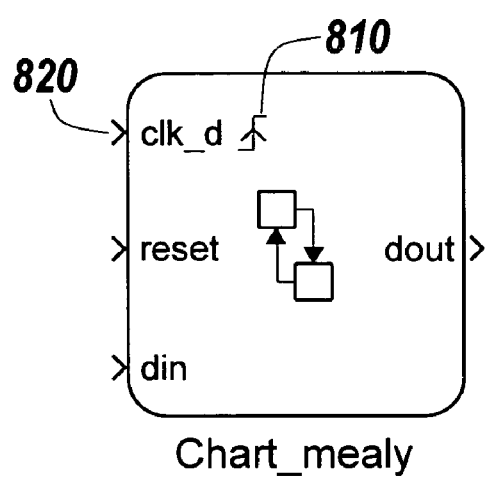
FIGS. 8A and 8B are exemplary block symbols for the block representing a state diagram in FIG. 7.
Figure 8B:
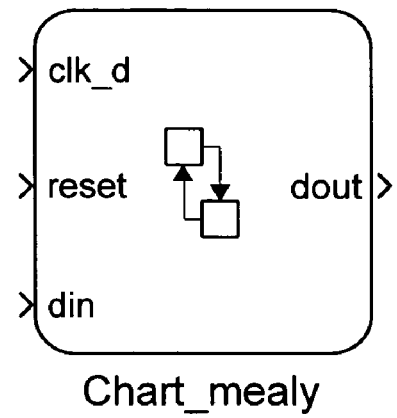

FIGS. 8A and 8B are exemplary block symbols for the block 710. The symbol depicted in FIG. 8A is an exemplary block symbol for the block 710 to indicate that an implicit synchronization signal is selected for the chart 300 represented by the block 710 while the block symbol depicted in FIG. 8B is an exemplary block symbol for the block 710 indicating that a synchronization signal is not selected for the chart 300 represented by the block 710. The "trigger" sign 810 next to the "clk_d" port 820 indicates that transitions in the chart 300 are guarded by the signal applied to this port 820. The "trigger" sign 810 appears near the "clk_d" port 820 when the option 410 is selected in the chart dialog 400. The block symbol depicted in FIG. 8A provides users with a direct visual indication of the "guarded transition" instead of having to open and look into a property dialog of the block 710. One of skill in the art will appreciate that the block symbol depicted in FIG. 8A is illustrative and other types of graphical and textual variations are possible to indicate that an implicit synchronization signal is selected for the chart 300.

Figure 9:
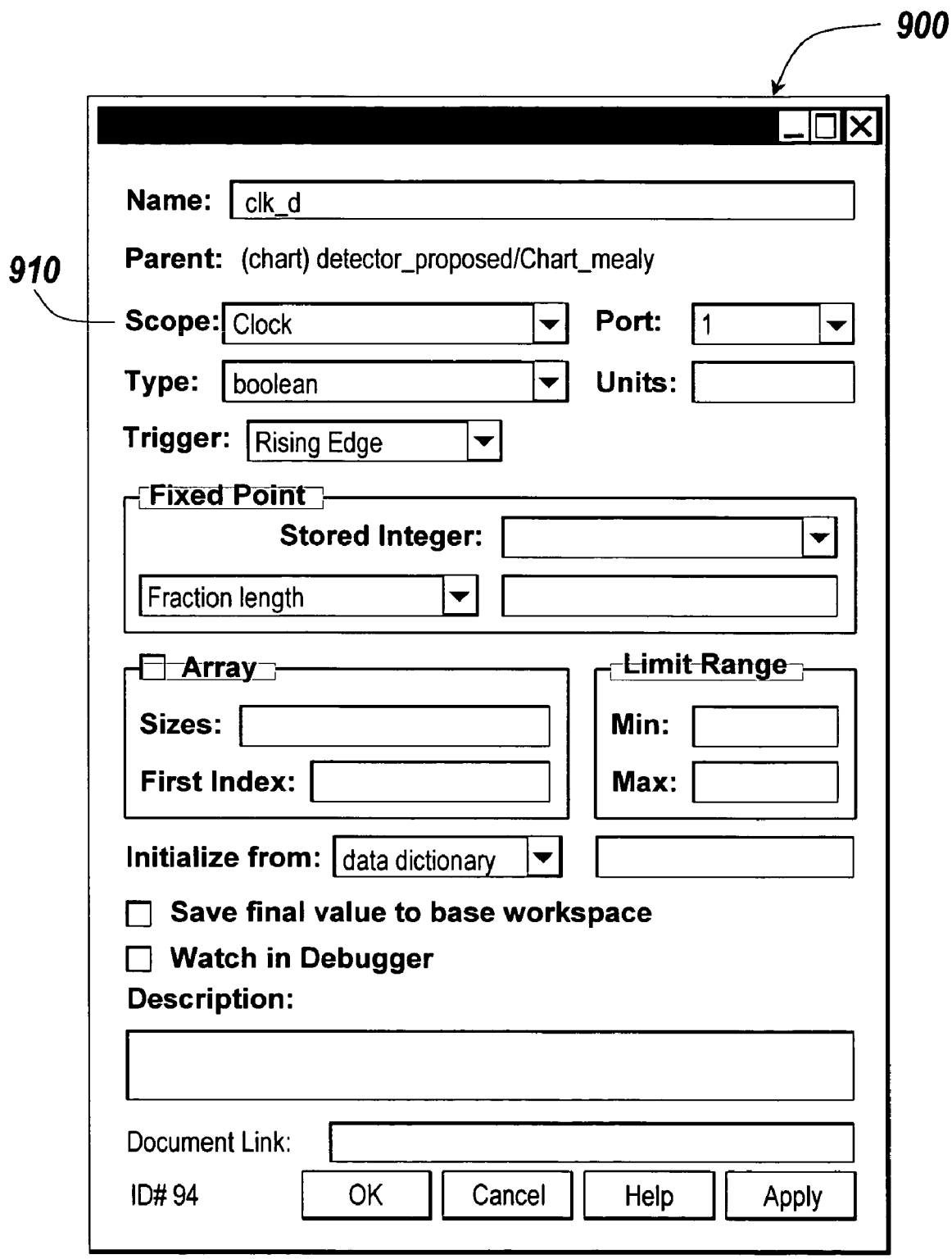
FIG. 9 is an exemplary data property dialog for the "clk_d" port of the block representing the chart in FIG. 7.

FIG. 9 is an exemplary data property dialog 900 for the "clk_d" port of the Chart_mealy block 710. The data property dialog 900 provides for the data properties of the "clk_d" port including Name, Parent, Scope, Type, Trigger, etc. The data property dialog 900 provides an option for selecting "Clock" for the "Scope" property of the "clk_d" port. The "Clock" is a special data input that triggers the guarded transitions in the chart 300 represented by the block 710. If the "Scope" property of the "clk_d" port is selected to "Clock," the dialog 900 also provides the users with an option to select the "Trigger" property of the "clk_d" port. The "Trigger" property may include a rising edge and/or falling edge. The transitions in the chart 300 represented by the block 710 are guarded by the signal defined in the data property dialog 900 for the "clk_d" port of the block 710.

Figure 10:
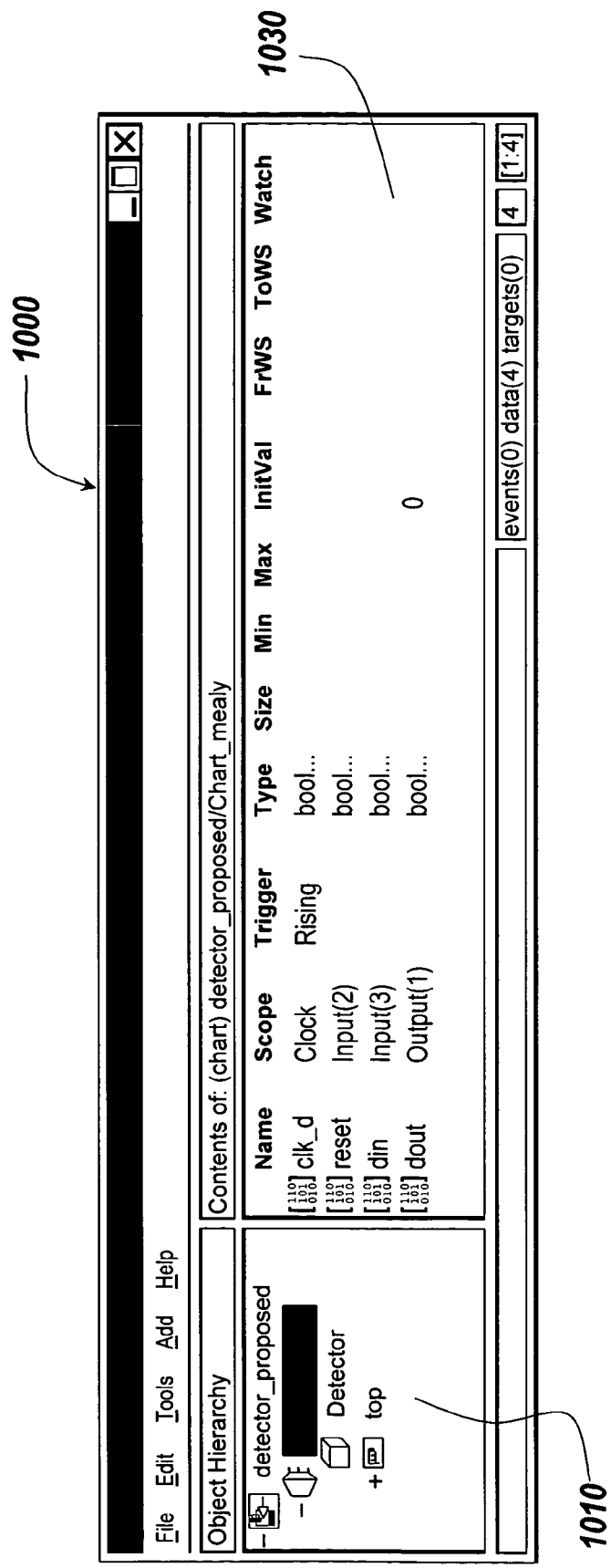
FIG. 10 is an exemplary model explorer dialog for the block diagram model depicted in FIG. 7.

FIG. 10 is an exemplary model explorer dialog 1000 for the block diagram model 700. The model explorer dialog 1000 may display the data, event, and target objects parented (contained) by each graphical element in the chart 300. The explorer main window 1000 has two panes, an object hierarchy pane 1010 on the left and a contents pane 1030 on the right. The object hierarchy pane 1010 displays the graphical elements of the chart (machines, charts, states, boxes, and graphical functions). A preceding plus (+) character indicates that the hierarchy can be expanded by double-clicking that entry or by clicking the plus (+) character. A preceding minus (−) character indicates that there is nothing to expand. Clicking an entry in the object hierarchy pane 1010 selects that entry. The contents pane 1030 displays the properties of data, event, and target objects parented by the currently selected object in the object hierarchy pane 1010. In this example, the Chart_mealy block is selected in the object hierarchy pane 1010 and the data properties of "clk_d", "reset", "din" and "dout" ports of the Chart_mealy block 710 are displayed in the contents pane 1030. The data properties of the ports include Name, Scope, Trigger, Type, etc. As shown in the dialog 1000, the data properties of the "clk_d" port include "Clock" for the "Scope" property, "Rising" for the "Trigger" property and "Boolean" for the "Type" property. The "Clock" property is a special data input that triggers the guarded transitions in the chart 300 represented by the block 710. If the "Scope" property of the "clk_d" port is selected to "Clock," the transitions in the chart 300 represented by the block 710 are guarded by the signal defined for the "clk_d" port of the block 710.

Figure 11:
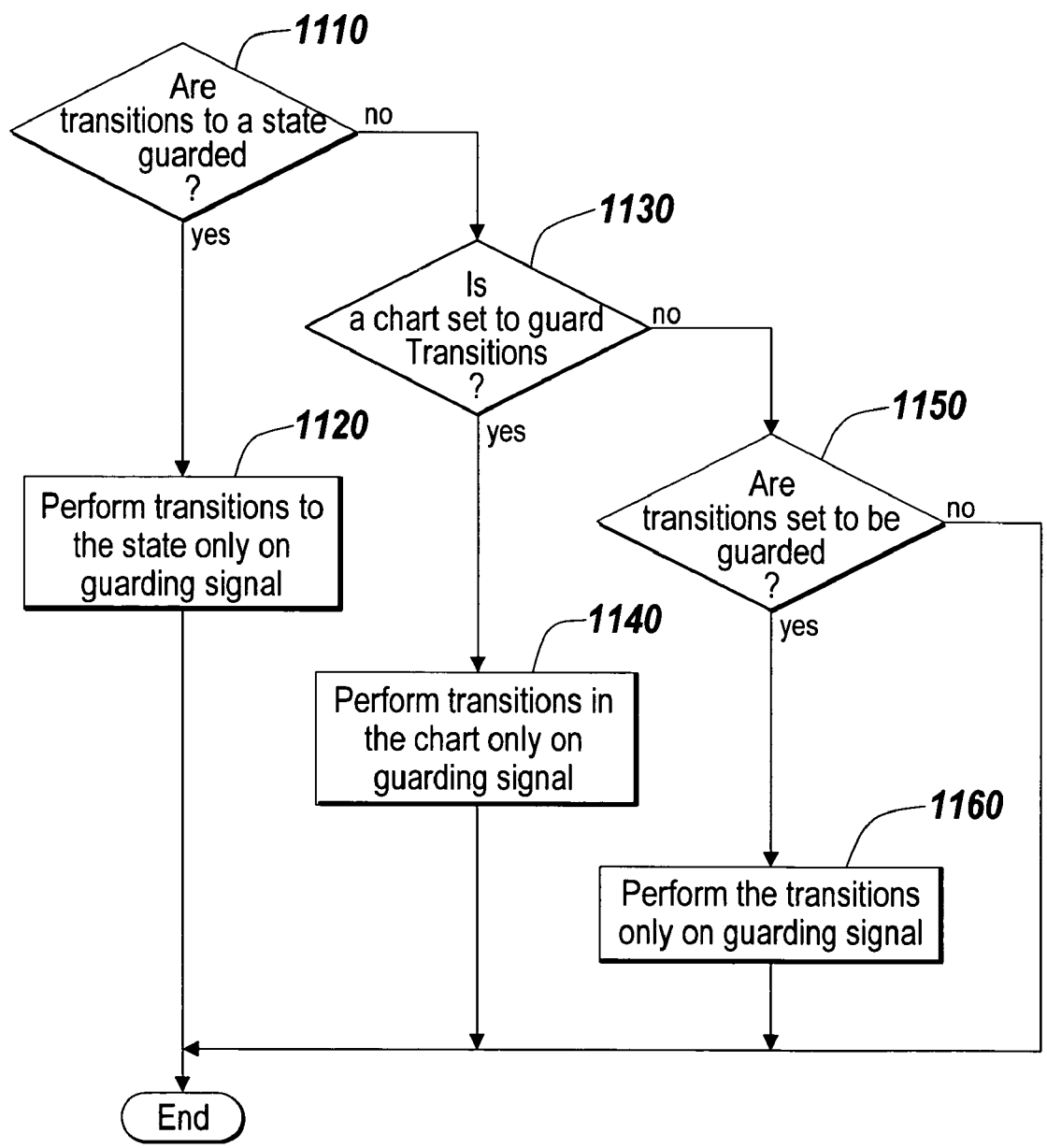
FIG. 11 depicts an exemplary operation for executing a model in the illustrative embodiment of the present invention.

Referring back to FIG. 2B, the execution engine 130 may execute the model 150 edited in the modeling environment 100 (step 215). FIG. 11 depicts an exemplary operation for executing the model 300 shown in FIG. 3 or the model 700 shown in FIG. 7. The properties and parameters of the model defined using the GUIs depicted in FIGS. 4, 5 and 9 are saved with the model. The execution engine 130 examines the properties and parameters of the states 310-330 to determine whether the transitions to the states 310-330 should be implicitly guarded (step 1110). If the model is set to implicitly guard the transitions to the state, the execution engine 130 executes the transitions to the state only when the event defined in the state property dialog occurs (step 1120). The execution engine 130 may also examine the properties and parameters saved in the chart 300 to determine whether the transitions in the chart 300 are implicitly guarded (step 1130). If a state is set to implicitly guard the transitions in the chart 300, the execution engine 130 executes the transitions only when the defined event, such as the rising and/or falling edges of clock signals, occurs (step 1140). The execution engine 130 may further examine the properties and parameters of each transition to determine whether each transition is set to be implicitly guarded (step 1150). If a transition is set to be implicitly guarded, the execution engine 130 executes the transition only when a defined action occurs (step 1160).

In summary, the illustrative embodiment of the present invention provides for a synchronous model in a modeling environment. In particular, the illustrative embodiment of the present invention provides for a state diagram in which transitions to states are implicitly synchronized with a signal selected by users using a chart dialog or state dialog. One of skill in the art will appreciate that the implicit synchronization of the present invention may apply to models implemented in other modeling environment, such as a time-based and/or dataflow-based block diagram modeling environment. In the illustrative embodiment, a clock signal is utilized to synchronize the transitions. One of skill in the art will appreciate that other types of signals, such as pulse signals, may be used to synchronize the transitions. With the implicit synchronization, the illustrative embodiment of the present invention enables the users to model clock synchronized behavior of hardware systems without adding transition-guarding clock signal to each of the transitions in the chart. Therefore, the illustrative embodiment of the present invention dramatically simplifies the design entry for the models of the systems and allows the users to design more complex systems.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any other modeling environment that provides for the synchronization of actions in a model. Practitioners of the art will realize that the sequence of steps and architectures depicted in the figures may be altered without departing from the scope of the present invention and that the illustrations contained herein are singular examples of a multitude of possible depictions of the present invention.

We claim:

1. In an electronic device that provides a modeling environment, a method for building the model, wherein the electronic device includes a display device, the method comprising:
   displaying a first graphical element on the display device, the first graphical element representing a first component of the model;
   displaying a second graphical element on the display device, the second graphical element representing a second component of the model;
   displaying a third graphical element between the first and second graphical elements representing an action between the first and second components of the model;
   displaying a dialog associated with the model, the dialog providing an option for selecting whether the action is guarded by a guarding signal, the guarding signal relating to one or more events that occur during an execution of the model; and
   in response to a selection of the guarding signal in the dialog, synchronizing the action with the guarding signal without providing a connection of the guarding signal to the first and second components, synchronizing the action comprising:
   determining, during the execution of the model, at least one of whether the action is guarded by the guarding signal, whether each action associated with the first component or the second component is guarded by the guarding signal, and whether each action associated with the model is guarded by the guarding signal, and
   permitting the action to execute only when the one or more events occur if it is determined that the action is guarded by the guarding signal, each action associated with the first component or the second component is guarded by the guarding signal, or that each action associated with the model is guarded by the guarding signal.

2. The method of claim 1 wherein the modeling environment includes a state-based modeling environment.

3. The method of claim 1 wherein one of the first and second components of the model includes a state.

4. The method of claim 1 wherein both of the first and second components of the model include states.

5. The method of claim 1 wherein the action between first and second components of the model includes a transition between states.

6. The method of claim 1 wherein the first and second components are a same state.

7. The method of claim 1 wherein the first and second components are different states.

8. The method of claim 5 wherein the third graphical element includes an arrow indicating the transition between the states.

9. The method of claim 5 wherein the third graphical element includes a representation of a condition that produces an output at the transition between the states.

10. The method of claim 9 wherein the third graphical element includes a representation of a value for the output produced on the condition.

11. The method of claim 1 wherein the dialog enables the users to set up parameters of the model for implicitly synchronizing the action between the first and second components.

12. The method of claim 11 wherein the parameters include a selection of the signal by which the action is synchronized.

13. The method of claim 11 wherein the parameters include a selection of a triggering edge of the signal that triggers the action between the first and second components.

14. The method of claim 1 further comprising:
in response to users' selection in connection with one of the first and second graphical elements, providing a user interface that enables the users to synchronize the action to one of the first and second graphical elements by the guarding signal.

15. The method of claim 14 wherein the user interface enables the users to set up parameters for the action to one of the first and second components.

16. The method of claim 15 wherein the parameters include a selection of the signal by which the transition is synchronized.

17. The method of claim 15 wherein the parameters include a selection of a triggering edge of the signal that triggers the action between the first and second components.

18. The method of claim 1, further comprising:
displaying an indicator in the model, the indicator indicating that the action is implicitly guarded.

19. The method of claim 1 wherein the attribute is at least one of a sample time and sample rate.

20. In an electronic device that provides a modeling environment, a method for building the model, wherein the electronic device includes a display, the method comprising:
providing a graphical element for representing a sub-model of the model, wherein the sub-model includes a plurality of components and an action between the plurality of components;
displaying a dialog associated with the model, the dialog providing an option for selecting whether the action is guarded by a guarding signal, the guarding signal relating to one or more events that occur during an execution of the model; and
in response to a selection of the guarding signal in the dialog, synchronizing the action with the guarding signal without a connection of the guarding signal to the plurality of components, synchronizing the action comprising:
determining, during the execution of the model, at least one of whether the action is guarded by the guarding signal, whether each action associated with the first the plurality of components is guarded by the guarding signal, and whether each action associated with the model is guarded by the guarding signal, and
permitting the action to execute only when the one or more events occur if it is determined that the action is guarded by the guarding signal, each action associated with the plurality of components is guarded by the guarding signal, or that each action associated with the model is guarded by the guarding signal;
providing the graphical element with a port to which the predetermined signal is applied; and
displaying the model to a user, the model including a displayed indicator indicating that the action is implicitly guarded.

21. The method of claim 20 wherein the modeling environment includes a time-based block diagram modeling environment.

22. The method of claim 20 wherein the sub-model includes a plurality of states in a state-based modeling environment and the action between the plurality of components includes a transition between the plurality of states in the sub-model.

23. The method of claim 20 wherein the dialog enables the selection of a clock as a source of a signal for the port.

24. The method of claim 20 wherein the dialog enables the selection of a signal edge as a trigger for the action.

25. A non-transitory medium holding instructions executable in a computer for building a model, wherein the computer includes a display, the medium comprising:
instructions for displaying a first graphical element on the display, the first graphical element representing a first component of the model;
instructions for displaying a second graphical element on the model, the second graphical element representing a second component of the model; and
instructions for displaying a third graphical element between the first and second graphical elements, the third graphical element representing an action between the first and second component of the model;
instructions for displaying a dialog associated with the model, the dialog providing an option for selecting whether the action is guarded by a guarding signal, the guarding signal relating to one or more events that occur during an execution of the model; and
instructions for synchronizing the action with the guarding signal in response to a selection of the guarding signal in the dialog without providing a connection of the guarding signal to the first and second components, synchronizing the action comprising:
determining, during the execution of the model, at least one of whether the action is guarded by the guarding signal, whether each action associated with the first component or the second component is guarded by the guarding signal, and whether each action associated with the model is guarded by the guarding signal, and
permitting the action to execute only when the one or more events occur if it is determined that the action is guarded by the guarding signal, each action associated with the first component or the second component is guarded by the guarding signal, or that each action associated with the model is guarded by the guarding signal.

26. The medium of claim 25 further comprising:
in response to a user selection in connection with one of the first and second graphical elements, providing a user interface that enables the user to select a mode of one of the first and second component in which the action to one of the first and second graphical elements is implicitly guarded by one or more attributes of the guarding signal.

27. The medium of claim 25 wherein the medium further comprises:
instructions for displaying an indicator in the model, the indicator indicating that the action is implicitly guarded.

28. The medium of claim 25 wherein the attribute is at least one of a sample time and sample rate.

29. A system for building a model in a modeling environment, wherein the system includes a display device, the system comprising:

a first graphical element provided on the display device, the first graphical element representing a first component of the model;

a second graphical element provided on the display device, the second graphical element representing a second component of the model; and a displayed third graphical element provided between the first and second graphical elements, the displayed third graphical element representing an action between the first and second components of the model, a displayed dialog associated with the model, the dialog providing an option for selecting whether the action is guarded by a guarding signal, the guarding signal relating to one or more events that occur during an execution of the model, wherein the action is synchronized with the guarding signal in response to a selection in the dialog without a connection of the guarding signal to the first and second components, synchronizing the action comprising:

determining, during the execution of the model, at least one of whether the action is guarded by the guarding signal, whether each action associated with the first component or the second component is guarded by the guarding signal, and whether each action associated with the model is guarded by the guarding signal, and permitting the action to execute only when the one or more events occur if it is determined that the action is guarded by the guarding signal, each action associated with the first component or the second component is guarded by the guarding signal, or that each action associated with the model is guarded by the guarding signal.

30. The system of claim 29, wherein the modeling environment includes a state-based modeling environment.

31. The system of claim 29, wherein at least one of the first and second components of the model includes a state.

32. The system of claim 29, wherein the action between first and second components of the model includes a transition between states.

33. The system of claim 29, further comprising:
a user interface that enables the users to synchronize the action to one of the first and second graphical elements by the guarding signal.

* * * * *